United States Patent
Donley

(10) Patent No.: US 9,658,960 B2
(45) Date of Patent: May 23, 2017

(54) SUBCACHE AFFINITY

(75) Inventor: Greggory D. Donley, San Jose, CA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 1189 days.

(21) Appl. No.: 12/975,640

(22) Filed: Dec. 22, 2010

(65) Prior Publication Data

US 2012/0166729 A1    Jun. 28, 2012

(51) Int. Cl.
    *G06F 12/02*    (2006.01)
    *G06F 12/084*   (2016.01)

(52) U.S. Cl.
    CPC ................. *G06F 12/084* (2013.01)

(58) Field of Classification Search
    None
    See application file for complete search history.

(56) References Cited

U.S. PATENT DOCUMENTS

| | | | |
|---|---|---|---|
| 6,438,641 B1* | 8/2002 | Kanno et al. | 711/5 |
| 7,600,143 B1* | 10/2009 | Neuman | G06F 7/06 713/500 |
| 8,028,129 B2* | 9/2011 | Hughes et al. | 711/130 |
| 2002/0188804 A1* | 12/2002 | Rakvic et al. | 711/118 |
| 2009/0271572 A1* | 10/2009 | Hughes et al. | 711/121 |
| 2012/0144118 A1* | 6/2012 | Tsien et al. | 711/122 |

* cited by examiner

*Primary Examiner* — Charles Rones
*Assistant Examiner* — Ryan Dare
(74) *Attorney, Agent, or Firm* — Volpe and Koenig, P.C.

(57) ABSTRACT

A method and apparatus for controlling affinity of subcaches is disclosed. When a core compute unit evicts a line of victim data, a prioritized search for space allocation on available subcaches is executed, in order of proximity between the subcache and the compute unit. The victim data may be injected into an adjacent subcache if space is available. Otherwise, a line may be evicted from the adjacent subcache to make room for the victim data or the victim data may be sent to the next closest subcache. To retrieve data, a core compute unit sends a Tag Lookup Request message directly to the nearest subcache as well as to a cache controller, which controls routing of messages to all of the subcaches. A Tag Lookup Response message is sent back to the cache controller to indicate if the requested data is located in the nearest sub-cache.

20 Claims, 5 Drawing Sheets

SUBCACHE AFFINITY

FIELD OF INVENTION

This application is related to controlling subcache affinity.

BACKGROUND

In a data center, many processors may be operating and running a multitude of applications at any given time. A scheduler, or scheduling software, may determine on which processor an application is to be run. Each processor may have access for storing information in a cache, such as a level 3 (L3) cache, that is associated with the processor. Additionally, each processor may include multiple compute units, (e.g., cores, core pairs, threads), that can run different applications within the processor concurrently. The L3 cache may be divided into several subcaches, physically located near the compute units such that one subcache is the nearest to a particular compute unit. When an application is running on a processor, information relating to that application is stored in, and extracted out of, one or more L3 subcaches. While the application is running, whichever of the L3 subcaches that are utilized have affinity with the processor that is running the application. Latencies of messages routed to and from a subcache are affected by its proximity to a compute unit that is accessing the subcache.

SUMMARY OF EMBODIMENTS

A method and apparatus for controlling affinity of subcaches is disclosed. When a core compute unit evicts a line of victim data, a prioritized search for space allocation on available subcaches is executed, in order of proximity between the subcache and the compute unit. The victim data may be injected into the nearest adjacent subcache if space is available. Alternatively, the victim data may be sent to the next closest subcache having available space for allocation, or a line may be evicted from a preferred subcache to make room for the victim data.

When a core compute unit is ready to retrieve data, a Tag Lookup Request message is sent directly to the nearest subcache as well as to a cache controller which controls routing of messages to all of the subcaches. If the requested data is located in the nearest sub-cache, a Tag Lookup Response message is sent back to the cache controller to acknowledge the request.

DETAILED DESCRIPTION OF THE EMBODIMENTS

In order to provide for multiple applications having, for example, different QoS requirements, to be run on different compute units, such as a thread, core or core pair within the same processing unit, a cache, such as the L3 cache, may be partitioned into subcaches. Each compute unit, or a group of compute units, may be allocated one or more subcaches within the L3 cache in which to store data for an application running on the compute unit.

Figure 1:
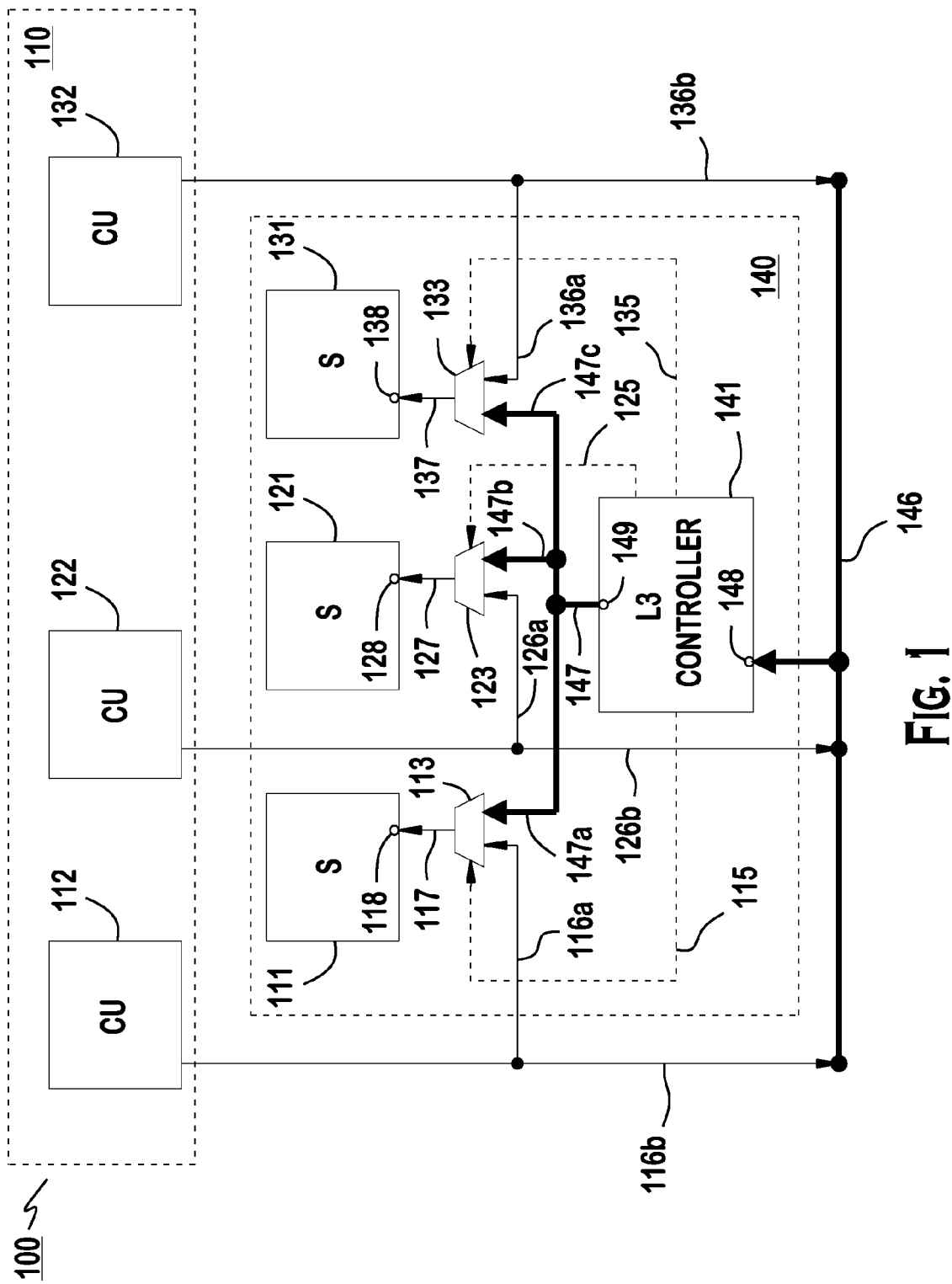
FIG. 1 is an example functional block diagram of a processor including several computing units, subcaches and a level 3 (L3) controller during a Tag Lookup Request message delivery.

FIG. 1 is an example functional block diagram of a processor 100. The processor 100 may be any one of a variety of processors such as a Central Processing Unit (CPU) or a Graphics Processing Unit (GPU). For instance, it may be a x86 processor that implements an x86 64-bit instruction set architecture and is used in desktops, laptops, servers, and superscalar computers, or it may be an Advanced RISC (Reduced Instruction Set Computer) Machine (ARM) processor that is used in mobile phones or digital media players. Other embodiments of the processor are contemplated, such as Digital Signal Processors (DSP) that are particularly useful in the processing and implementation of algorithms related to digital signals, such as voice data and communication signals, and microcontrollers that are useful in consumer applications, such as printers and copy machines.

Although the embodiment of FIG. 1 includes one processor for illustrative purposes, any other number of processors will be in-line with the described embodiment. The processor 100 includes a processing unit 110 and an L3 entity 140. The processing unit 110 includes, for example, a plurality of compute units 112, 122, and 132. The L3 entity 140 includes an L3 controller 141, subcaches 111, 121 and 131, and multiplexers 113, 123 and 133. To extract information from the subcaches 111, 121, 131, a compute unit 112, 122, and 132 may send a Tag Lookup Request message to one or more of the subcaches 111, 121, 131, via the L3 controller 141. The L3 controller 141 controls the routing of the Tag Lookup Request messages to the subcaches 111, 121, 131. When the subcache 111, 121, 131 receives the Tag Lookup Request message, it checks for a match of the requested tag (e.g., a bit string) at an address line in the subcache 111, 121, 131 as indicated by a location index included within the Tag Lookup Request message.

The L3 entity 140 is configured such that for each of subcaches 111, 121, 131, there is a respective multiplexer 113, 123, 133 coupled to a Tag Lookup Request input port 118, 128, 138 of the subcache 111, 121, 131. Each multiplexer 113, 123, 133 has two inputs, one coming directly from the compute units 112, 122, 132, and the other coming from the L3 controller 141. Thus, a Tag Lookup Request coming directly from compute units 112, 122, 132 travels to the multiplexers 113, 123, 133 along inputs 116a, 126a, 136a, while a Tag Lookup Request message sent from the L3 controller 141 enters the multiplexers 113, 123, 133 from inputs 147a, 147b, 147c. The multiplexers 113, 123, 133 are switched by control logic of the L3 controller 141, and the control signal is transmitted along the multiplexer control inputs 115, 125 and 135, instructing the multiplexer 113, 123, 133 to accept either of two message inputs, 116a/147a, 126a/147b, 136a/147c, for passing a Tag Lookup Request message over to a corresponding subcache 111, 121, 131. This 2:1 multiplexed configuration for inputs to subcaches 111, 121, 131 allows a Tag Lookup Request message to be received from two possible parallel source paths, either the compute unit 112, 122, 132, or the L3 controller 141.

Using compute unit 112 as an example, a normal path for a Tag Lookup Request message runs from the compute unit 112 along path 116b to the bus 146, which is coupled to a single input port 148 of the L3 controller 141. After processing the Tag Lookup Request message and allocating a time interval for the Tag Lookup Request in conjunction with Tag Lookup Request messages from other compute units 122, 132 arriving serially, the L3 controller 141 sends the Tag Lookup Request from output port 149 as a broadcast to one or more of the subcaches 111, 121, 131 via the multiplexers 113, 123, 133. The multiplexer 113 is switched by the L3 controller 141 using control line 115, according to control logic that sets the multiplexer output 117 to accept signals from input path 147 when the L3 controller 141 is actively sending information on path 147.

A bypass path 116a is also available for sending the Tag Lookup Request message, which couples the compute unit 112 directly to the multiplexer 113 and then to the subcache 111 by input line 117. This bypass path 116a is the default position for the multiplexer 113 as controlled by the L3 controller logic on a condition that the L3 controller 141 is not actively sending information on path 147a to the multiplexer 113. As shown in FIG. 1, the Tag Lookup Request lines 116a and 116b send the Tag Lookup Request message in a parallel path toward the subcache 111. Since the subcache 111 is physically adjacent to the compute unit 112, the bypass path 116a is preferred as it allows the Tag Lookup Request message to more quickly reach the subcache 111 by avoiding the longer latency along path 116b through the L3 controller 141. If the subcache 111 does contain the particular data that the compute unit 112 is seeking, then this reduced latency path 116a will allow the compute unit 112 to ultimately retrieve the data more quickly by eliminating a portion of the duration normally taken for locating the data.

A Tag Lookup Request message sent from compute unit 122 or compute unit 132 is routed similarly to their respective subcaches 121 and 131 as described above with respect to compute unit 112. Compute unit 122 is coupled to the L3 controller 141 by line 126b to the bus 146 for a normal path to the subcache 121. The bypass path for compute unit 122 is through line 126a to multiplexer 123. The L3 controller 141 controls the switching of the multiplexer 123 by the control input 125. A Tag Lookup Request message from the compute unit 132 may be sent either along the bypass path 136a to the multiplexer 133, or along the normal path 136b and 146 to the L3 controller 141, with multiplexer 133 switching controlled by the control input 135.

While FIG. 1 shows a processor configuration of three compute units 112, 122, 132 and three subcaches 111, 121, 131, this is for illustration purposes only and does not reflect any intended limit to the number of these entities. The processor 100 may comprise any number of compute units 112, 122, 132, subcaches 111, 121, 131 and corresponding multiplexers 113, 123, 133. Each of the compute units 112, 122, 132 may be in the form of a core in the processing unit 110, a pair of cores (core pair) in the processing unit 110 or a thread.

The above described configuration 100 may be implemented according to logic in the L3 controller 141 that follows a latency reduction constraint, or a power reduction constraint. Under the latency reduction constraint, the L3 controller logic will attempt to have Tag Lookup Request messages forwarded to the subcaches 111, 121, 131 as quickly as possible, with less regard for the number of subcaches 111, 121, 131 receiving such request messages, and for whether the Tag Lookup Request messages are redundant. Under the power control constraint, the L3 controller logic is adapted to minimize the number of Tag Lookup Request messages sent to each subcache 111, 121, 131, so that power consumption used for such processing can be kept to a minimum. It should be noted that overall latency is reduced compared with conventional processors, as the bypass path 116a, 126a, 136a is applied, regardless of which of these constraints is implemented.

Figure 2:
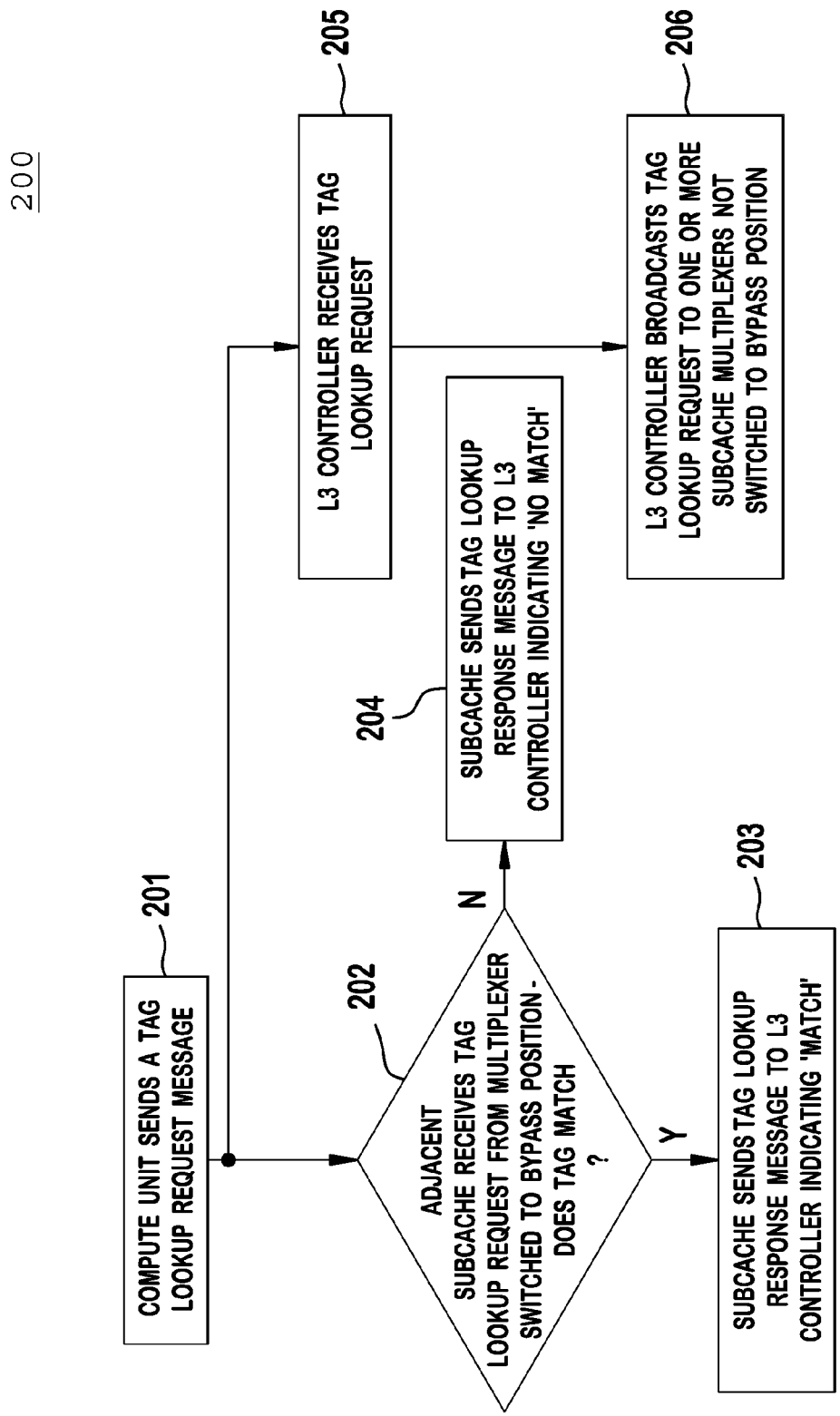
FIG. 2 is an example flow diagram of a method for a tag lookup request to a subcache.

FIG. 2 is an example flowchart for the latency reduction constraint method 200, with reference to the configuration 100 entities by way of example. In step 201, the compute unit 112 sends a Tag Lookup Request message to the multiplexer 113 and to the L3 controller 141. The multiplexer 113 is in the switched state that passes the Tag Lookup Request from path 116a to the subcache input 117, as the input 147a from the L3 controller 141 is presently idle. At step 202, the subcache 111 receives the Tag Lookup Request message and evaluates the location index and the tag by comparing the subcache 111 content at the address line corresponding to the location index. If there is a match, then the subcache 111 sends a Tag Lookup Response message to indicate to the L3 controller 141 that a match has occurred, and that the requested data has been located in subcache 111 (step 203), described in greater detail hereafter with reference to FIG. 4. If the tag lookup does not produce a match, then the subcache 111 sends a Tag Lookup Response message to the L3 controller 141 indicating no match (step 204).

Meanwhile, the L3 controller 141 processes the Tag Lookup Request message received from path 116b and bus 146 (step 205). The L3 controller 141 is aware that the multiplexer 113 is switched to the bypass position and that the Tag Lookup Request message has been sent directly from the compute unit 112. In order to minimize latency of locating the tag, the L3 controller 141 sends the Tag Lookup Request message as a broadcast message in step 205 to one or more of the remaining multiplexers 123, 133 that are not switched to the bypass position, and subsequently the broadcast is passed to the corresponding subcaches 121, 131 in order to allow one or more of the subcaches 121, 131 to search for the requested tag. Since the bypass path 116a is faster, the multiplexer 113 will have already passed the Tag Lookup Request message to the subcache 111. The compute unit 112 benefits by having reduced latency in the processing of the Tag Lookup Request sent along the bypass path 116a. Additionally, if no match occurs at subcache 111 (step 204), the latency for the Tag Lookup Request is minimized with respect to subcaches 121 and 131 by the L3 controller 141 sending a broadcast Tag Lookup Request message without any delay, instead of waiting for the result of the earlier tag lookup at the subcache 111.

Figure 3:
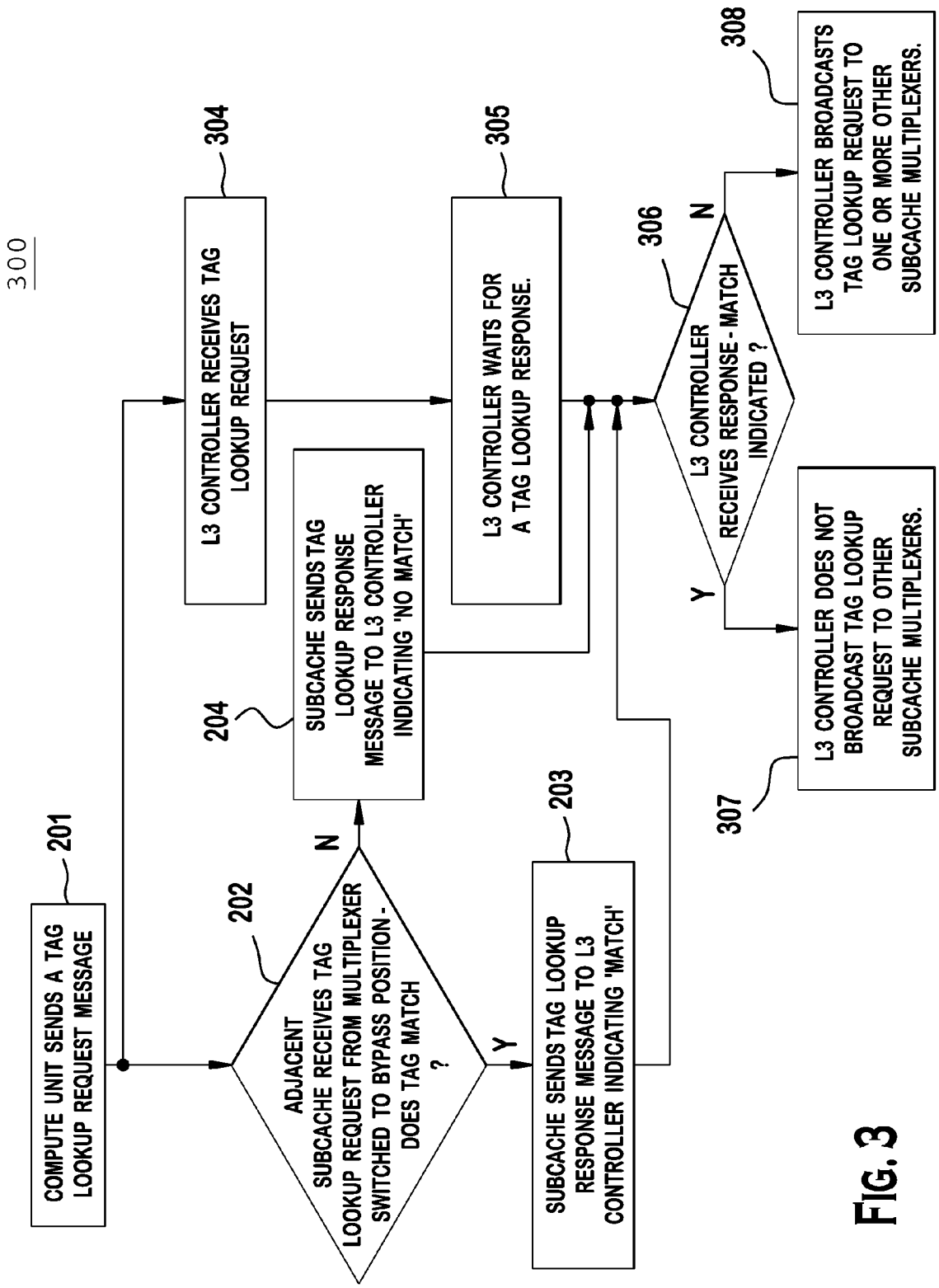
FIG. 3 is an example flow diagram of an alternative method for a tag lookup request to a subcache.

FIG. 3 shows an example flowchart for power control restraint method 300 implemented by the processor 100. In steps 201-204, the compute unit 112 sends its Tag Lookup Request message directly to the multiplexer 113 switched to bypass position, and the request is received and handled by the subcache 111 in the same way as described above with respect to FIG. 2. In parallel with step 202, the L3 controller 141 receives the Tag Lookup Request message from path 116b and bus 146 (step 304). In order to observe the power constraint, the L3 controller 141 delays sending the Tag Lookup Request message as a broadcast message and waits for a Tag Lookup Response in step 305 in case there is a match at step 303, and to avoid sending request messages to subcaches 121, 131 which do not contain the requested data. This results in power conservation at the L3 controller 141 and at the subcaches 121, 131 when the bypass path Tag Lookup Request message produces a match, since processing of the Tag Lookup Request is avoided at these entities. If at step 306, the L3 Controller 141 receives the Tag Lookup Response message indicating the tag match, the L3 controller 141 does not send the broadcast Tag Lookup Request to the multiplexers 123, 133 at step 307. If the L3 controller 141 receives a Tag Lookup Response from the subcache 111 indicating no match, then the L3 controller 141 may then proceed to send a broadcast Tag Lookup Request message to the other multiplexers 123, 133 not in the bypass state at step 308.

Figure 4:
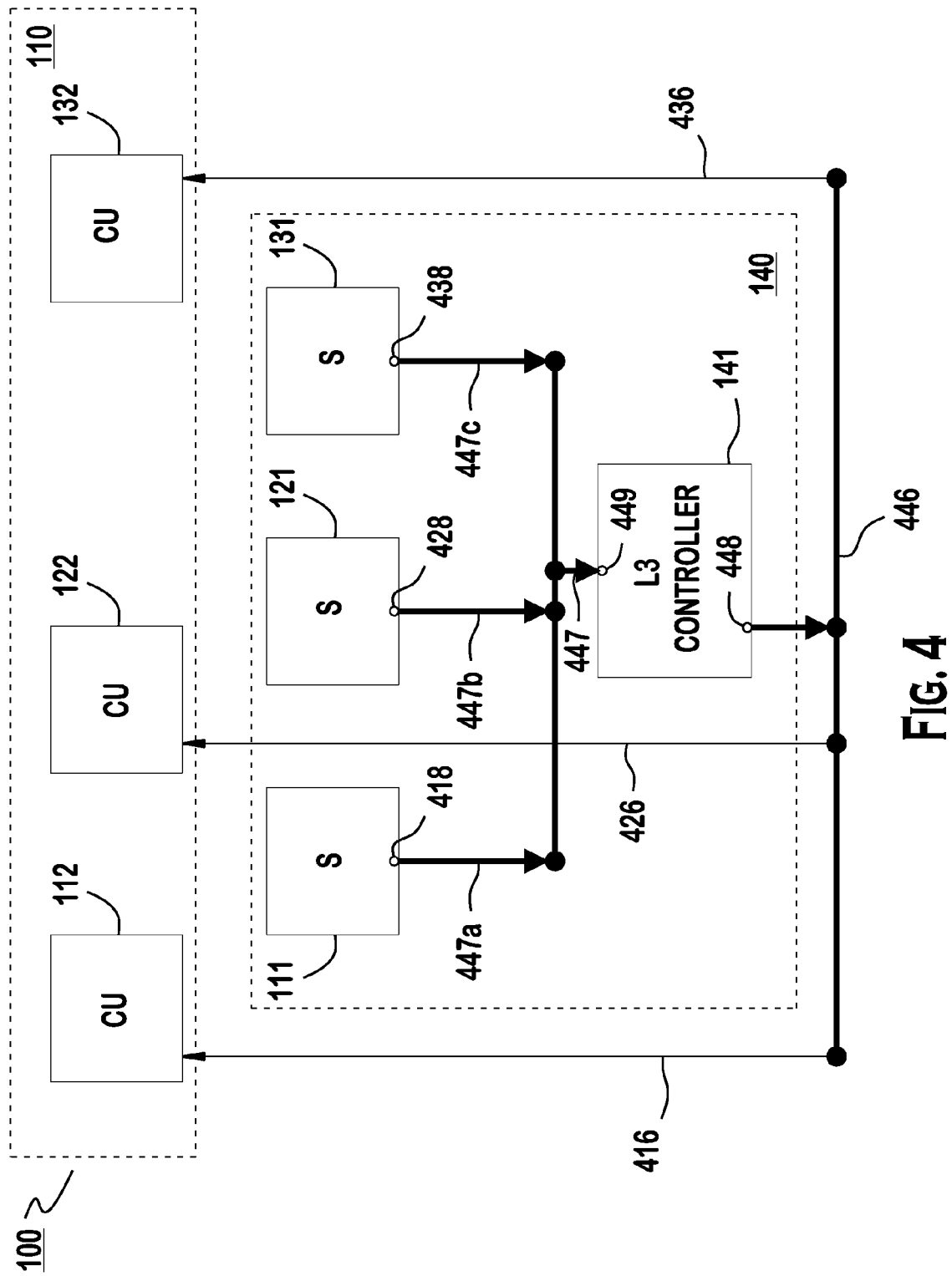
FIG. 4 is an example functional block diagram of a processor during a Tag Lookup Response message and a Data Response message delivery.

FIG. 4 is an example functional block diagram of the processor 100 showing the configuration for processing a Tag Lookup Response message. Using subcache 111 as an example, upon matching the tag for a Tag Lookup Request sent by compute unit 112, the subcache 111 transmits a Tag Lookup Response message from the Tag Lookup Response port 418 along path 447a to a common channel 447 coupled to the L3 controller port 449. The L3 controller 141 receives the Tag Lookup Response message and processes the Tag Lookup Response message according to the latency reduction constraint and/or the power control constraint as previously described. If the Tag Lookup Response is to be sent to the compute unit 112, the message is processed for serial transmission with other Tag Lookup Response messages from the subcaches 111, 121, 131, out of port 448 onto common channel 446. From there, the Tag Lookup Response message is sent along path 416 for reception by the compute unit 112.

Figure 5:
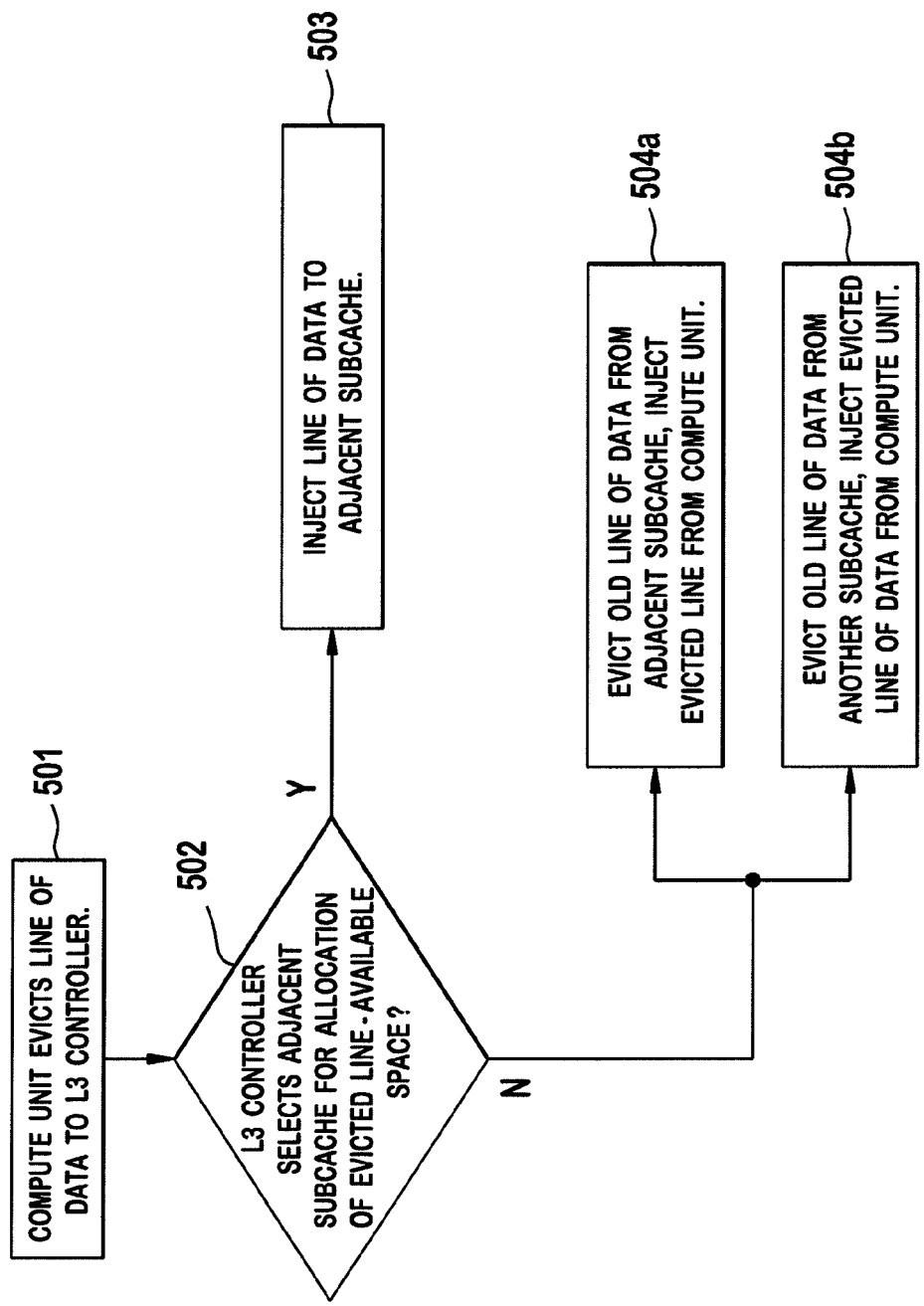
FIG. 5 is a method flowchart for an allocation method during eviction of a line of data by a computing unit.

FIG. 5 shows a flowchart for an allocation method 500 that skews placement of data into the subcaches 111, 121, 131 with preference given to a particular compute unit 112, 122, 132 predicted to be interested in that data. This method 500 pertains to eviction of a line of data from a compute unit 112, 122, 132 to a preferred subcache 111, 121, 131, which could improve probability of a successful match during the Tag Lookup Request procedure described above. Using compute unit 112 as an example, in step 501, a line of victim data is evicted from the compute unit 112 to the L3 controller 141. At step 502, the L3 controller 141 selects the subcache 111 in priority from the other subcaches 121, 131 for being located closest to the compute unit 112, and examined for available storage space. This selection of subcache 111 based on its proximity to the compute unit 112, optimizes latency for later retrieval of this line of victim data with respect to the Tag Lookup process. If adequate space is available, then at step 503, the line of victim data is injected onto the subcache 111 by the L3 controller 141. If space is not currently available in subcache 111, then at step 504a, an obsolete line of data may be evicted from the subcache 111, to make space for the line of victim data from the compute unit 112, and the line of victim data is injected into that location of the subcache 111. As an alternative option (step 504b), if space is unavailable in the subcache 111, then another subcache 121, 131 is selected, and the line of victim data is injected to the selected subcache 121, 131. As a result, since the closest subcache 111 receives priority for allocation of evicted lines of data from the adjacent compute unit 112, the L3 controller 141 increases the likelihood of a match in step 202 during the Tag Lookup Request process. Depending on the type of program or application that the processor 100 will be executing, the selection of option 504a or 504b may be implemented. One way to determine which of the options step 504a, 504b is to be implemented may be to perform simulation trials and to evaluate latency reduction performance by comparisons of parameters against established benchmarks under the present conditions and parameters. Alternatively, one of the option steps 504a or 504b may be selected as the preferred option, while the remaining option step 504a or 504b would be implemented as a secondary option only upon detection of a particular condition.

Although features and elements are described above in particular combinations, each feature or element can be used alone without the other features and elements or in various combinations with or without other features and elements. The apparatus described herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). The apparatus described herein may be fabricated using mask works or a processor design by execution of a set of codes or instructions stored on a computer-readable storage medium.

For example, as described above, the processor 110 may include four core pairs, (i.e., 8 cores), while the L3 cache 130 may be an 8 megabyte (MB) cache, which may be partitioned into 2 MB subcaches. However, any number of cores may be included in the processor 110 and the cache 130 may be of any capacity. Additionally, although the above embodiments are described with respect to an L3 cache and compute units within a processor, the methods described above may apply to any type of cache and compute unit.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data (e.g., netlists, GDS data, or the like) that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method implemented by a cache controller in a processor for controlling tag lookup request messages from a compute unit to one of a plurality of subcaches, each respectively having a multiplexer on its input, comprising:
controlling a multiplexer to select a first tag lookup request at a first input of the multiplexer, the first input being directly connected to the compute unit with no intervening controller;
forwarding the selected tag lookup request to a first subcache of the plurality of subcaches that is physically closest to the compute unit relative to each of the plurality of subcaches;
responsive to obtaining a second tag lookup request, from a second compute unit, that is directed to the first subcache, providing the second tag lookup request to the multiplexer via a second input of the multiplexer, the second input being coupled to the cache controller;
controlling the multiplexer to select the second tag lookup request at the second input of the multiplexer; and forwarding the second tag lookup request to the first subcache.

2. The method of claim 1, further comprising broadcasting the first tag lookup request to at least one other of the plurality of subcaches before determining if the first subcache received the first tag lookup request.

3. The method of claim 1, further comprising not broadcasting the first tag lookup request to at least one other of the plurality of subcaches in response to receiving a tag lookup response associated with the first tag lookup request, wherein the tag lookup response indicates a match of the requested tag at an address line in the first subcache, indicating that data associated with the first tag lookup request has been located in the first subcache.

4. The method of claim 3, further comprising broadcasting the first tag lookup request to at least one other of the plurality of subcaches in response to receiving a tag lookup response associated with the first tag lookup request, wherein the tag lookup response indicates no match of the requested tag, indicating that data associated with the first tag lookup request has not been located in the first subcache.

5. The method of claim 1, further comprising:
receiving an evicted line of data from the compute unit;
prioritizing the plurality of subcaches in order of nearest proximity to the compute unit;
searching for available space to allocate and inject the evicted line of data in each prioritized subcache in the order of priority of nearness proximity to the compute unit; and
injecting the evicted line of data to an allocated available space in a subcache located from the search.

6. The method of claim 5, further comprising evicting an obsolete line of data from the first subcache to provide a space that can be allocated for the evicted line of data when there is inadequate space available in the first priority subcache.

7. The method of claim 5, further comprising injecting the evicted line of data to another subcache having lower priority than the first priority subcache when there is inadequate space available in the first priority subcache.

8. An apparatus, comprising:
a plurality of compute units;
a cache controller connected to each of the compute units;
a cache partitioned into a plurality of subcaches, each subcache connected to the cache controller to receive evicted lines from a compute unit; and
a plurality of multiplexers, wherein one multiplexer corresponds to one subcache such that a multiplexer output is connected to a tag lookup request port of the respective subcache, the tag lookup request port configured to handle a plurality of tag lookup requests, and wherein a first input of each multiplexer is connected to a respective nearest adjacent compute unit and a second input of each multiplexer is connected to an output of the cache controller;
wherein the cache controller is configured to:
control a multiplexer of the plurality of multiplexers to select a first tag lookup request at a first input of the multiplexer, the first input being directly connected to the compute unit with no intervening controller,
forward the selected tag lookup request to a first subcache of the plurality of subcaches that is physically closest to the compute unit relative to each of the plurality of subcaches,
responsive to obtaining a second tag lookup request, from a second compute unit, that is directed to the first subcache, provide the second tag lookup request to the multiplexer via a second input of the multiplexer, the second input being coupled to the cache controller,
control the multiplexer to select the second tag lookup request at the second input of the multiplexer, and
forward the second tag lookup request to the first subcache.

9. The apparatus of claim 8, wherein the compute unit includes a core or a core pair.

10. The apparatus of claim 8, wherein the cache is a level 3(L3) cache.

11. The apparatus of claim 8, wherein the cache controller is configured to broadcast the first tag lookup request to at least one other of the plurality of subcaches before determining if a first subcache corresponding with the first compute unit received the first tag lookup request from a first multiplexer corresponding to the first subcache.

12. The apparatus of claim 8, wherein the cache controller is configured to not broadcast the first tag lookup request to at least one other of the plurality of subcaches in response to receiving a tag lookup response associated with the first tag lookup request, wherein the tag lookup response indicates a match of the requested tag at an address line in the first subcache, indicating that data associated with the first tag lookup request has been located in the first subcache.

13. The apparatus of claim 12, wherein the cache controller is configured to not broadcast the first tag lookup request to any other subcache in response to receiving a tag lookup response associated with the first tag lookup request, wherein the tag lookup response indicates no match of the requested tag, indicating that data associated with the first tag lookup request has not been located in the first subcache.

14. The apparatus of claim 8, wherein the cache controller is configured to:
receive an evicted line of data from a compute unit of the plurality of compute units;
prioritize the plurality of subcaches in order of nearest proximity to the compute unit;
search for available space to allocate the evicted line of data in each prioritized subcache in the order of priority of nearness proximity to the compute unit; and
inject the evicted line of data to an allocated available space in a subcache located from the search.

15. The apparatus of claim 14, wherein the first priority subcache is configured to evict an obsolete line of data to provide a space that can be allocated for the evicted line of data when there is inadequate space available in the first priority subcache.

16. The apparatus of claim 14, wherein the cache controller is configured to inject the evicted line of data to another subcache having lower priority than the first priority subcache when there is inadequate space available in the first priority subcache.

17. A non-transitory computer-readable storage medium storing a set of codes or instructions for generating a mask work or a design of a processor, the processor configured to perform a method comprising:
controlling a multiplexer to select a first tag lookup request at a first input of the multiplexer, the first input being directly connected to a compute unit with no intervening controller;
forwarding the selected tag lookup request to a first subcache of the plurality of subcaches that is physically closest to the compute unit relative to each of the plurality of subcaches;
responsive to obtaining a second tag lookup request, from a second compute unit, that is directed to the first subcache, providing the second tag lookup request to the multiplexer via a second input of the multiplexer, the second input being coupled to the cache controller;

controlling the multiplexer to select the second tag lookup request at the second input of the multiplexer; and forwarding the second tag lookup request to the first subcache.

18. The medium of claim 17, wherein the method performed by the processor further comprises:

receiving an evicted line of data from the compute unit;

prioritizing the plurality of subcaches in order of nearest proximity to the compute unit;

searching for available space to allocate and inject the evicted line of data in each prioritized subcache in the order of priority of nearness proximity to the compute unit; and injecting the evicted line of data to an allocated available space in a subcache located from the search.

19. The medium of claim 18, wherein the method performed by the processor further comprises:

evicting an obsolete line of data from the first subcache to provide a space that can be allocated for the evicted line of data.

20. The medium of claim 18, wherein the method performed by the processor further comprises:

injecting the evicted line of data to another subcache having lower priority than the first priority subcache when there is inadequate space available in the first subcache.

\* \* \* \* \*